United States Patent Office 3,306,495
Patented Feb. 28, 1967

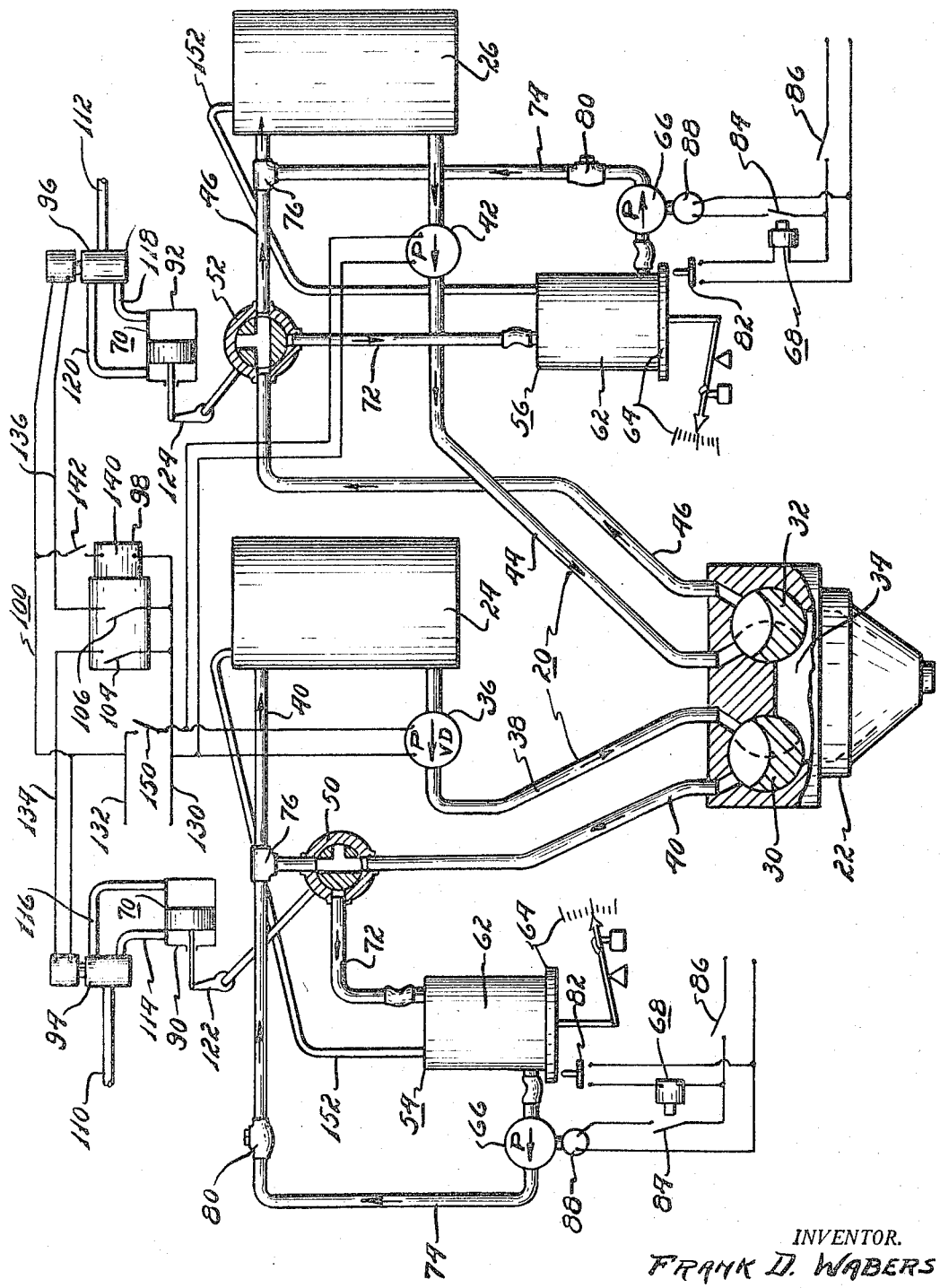

3,306,495
DISPENSING APPARATUS WITH CALIBRATING MEANS
Frank D. Wabers, Detroit, Mich., assignor to American Motors Corporation, Detroit, Mich., a corporation of Maryland
Filed June 2, 1964, Ser. No. 372,035
2 Claims. (Cl. 222—77)

This invention relates to calibrating devices in general and more particularly to a method and apparatus for checking and balancing the fluid flow rate of different fluid ingredients before they are mixed together.

There are a number of different instances when two fluids have to be mixed together in very precise proportions to obtain a desired result. One such instance is in making urethane foam insulation for refrigerator cabinets and the like.

Urethane foam insulation is produced by the chemical reaction of two fluid ingredients mixed together in certain proportions which should not vary more than one-half of one percent. Obviously, this close ratio is difficult to maintain since the flow rates of the different ingredients may vary for any of an untold number of reasons. For example, not only will changes in temperature, wear of parts, clogging of passages, etc. adversely affect the flow rate of each fluid ingredient, but they will affect each fluid ingredient differently and therefore cause innumerable combinations of variances.

Because of the difficulty of holding close proportions in the mixing of the fluid ingredients used to produce urethane foam, it is common to periodically draw samples and make certain tests. This is time consuming and will interrupt production if the operation is delayed while samples are drawn and tests are made. It is also wasteful of the product since the material drawn can seldom be returned for subsequent production use.

It is an object of this invention to teach a closed fluid flow measuring system, whereby fluid flow rates for different fluids may be determined, compared and balanced to assure proper proportions before being mixed together or mixed with other ingredients.

It is an object of this invention to provide means for diverting the flow of fluid from production use to a weighing station where the flow rate can be measured and from which it can be returned to production use at a later time.

It is an object of this invention to provide flow control means and timing means operative thereof and from which flow rates and comparisons can be made.

Further, it is an object of this invention to provide flow control means in different fluid flow systems with means in operative control of each thereof and useful in the comparative measuring of fluid flow rates and in obtaining desired proportions thereof.

To be more specific, it is an object of this invention to provide a system for diverting two different fluid ingredients from a chamber area where they are normally mixed together into two separate closed fluid flow systems including a tank in which the diverted flow may be weighed and weight comparisons made between the two fluids. Further, operative means are contemplated for timing the weighing operations as a measure of fluid flow rates and for a comparison thereof. And it is also proposed that automatic means be initiated to return the diverted flow for production use and to reset the system for use upon completion of the fluid flow calibrating operation.

These and other objects and advantages to be gained in the practice of this invention will be more apparent upon a reading of the following specification directed to a preferred embodiment and having reference to the accompanying drawing.

In the single drawing figure, a diagrammatic presentation of a preferred embodiment of the present invention is shown.

The drawing shows a urethane foam dispensing apparatus 20 of a type having two or more storage tanks wherein each tank contains an ingredient or component that is metered in its flow to a suitable mixing head 22 to be intermixed and dispensed into a mold or an article (not shown) such as between the walls of a refrigerator cabinet, wherein the mixture begins a foaming and expanding action to fill the void. After the foaming action ceases and is cured, or sets, it becomes rigid and may serve as a heat barrier, as in a refrigerator cabinet.

The dispensing apparatus 20 comprises storage tanks 24, 26 each connected by respective conduits to the head 22. The head 22 may be any well known commercial type having operable valves 30, 32. The valve 30 controlling the flow from the tank 24 to a mixing chamber 34, and the valve 32 controlling the flow from the tank 26 to the mixing chamber 34.

The outlet of the tank 24 is connected to the inlet of a variable displacement pump 36 whose outlet is connected by a conduit 38 to the valve 30. The valve 30 is arranged when no flow is desired to the mixing chamber to recirculate the flow back to the tank 24 by directing the flow from the conduit 38 into a conduit 40 which connects into the top of the tank 24.

The outlet of the tank 26 is connected to the inlet of a fixed displacement pump 42, which, if desired, may be of the variable displacement type of pump 36. The outlet of pump 42 is connected by a conduit 44 to the valve 32. The valve 32 is similar to the valve 30. The valve 32 when operated in one position will direct the flow from tank 26 into the mixing chamber 34 and when operated in a second position will recirculate the flow back into the tank 26 by directing it from conduit 44 into a conduit 46 whose other end is connected into the top of the tank 26.

The ingredient in the tank 24 may be a formulated urethane resinate while the tank 26 may contain an isocyanate component. To formulate a proper urethane mixture that will properly foam it is essential that the flow from each tank be at a fixed relative ratio by weight or otherwise to the other flowing component as they enter the mixing chamber. The proportion of each component in the mix is critical and must not exceed one-half of one percent and so it is essential at the outset that the operator check each flow. It is also essential that the operator at periodic intervals check at least one flow to be sure that the proportions have not varied due to changes in pump output, pump speed, or if the components may have altered in density, viscosity due to temperature changes, or the like.

To provide for a ready flow check there is interposed in each of the return conduits 40, 46 a respective three way valve 50, 52. The valves 50, 52 are each arranged that when operated in one position will cause the flow to return directly from the head 22 into the respective storage tank, and when operated into a second position will cause the flow to be by-passed, that is, directed into a respective weighing apparatus 54, 56.

Each of the weighing apparatus 54, 56 is similar in construction and operation and each comprises a container or receptacle 62 to receive the by-passed flow, a weighing scale 64 to weigh the flow received in the container, a pump 66 to transfer the fluid from the container back to its respective storage tank, a control circuit 68 to automatically stop the operation of the pump 66 after the transfer has been completed, and a control apparatus 70 to operate the respective valve 50 or 52 to automatically stop the flow into the container 62 after a predetermined timed interval.

Each weighing apparatus 54, 56 is similarly connected in a flow control circuit. A conduit 72 interconnects a respective three way valve to a respective container 62 whose outlet is connected to the inlet of a pump 66 which in turn is connected by a conduit 74 to a T connection 76 in the respective return conduits 40, 46. The T connection 76 in the conduit 40 is made between the valve 50 and storage tank 24, and in the conduit 46 it is between the valve 52 and storage tank 26. In each conduit 72 a check valve 80 is interposed to prevent a reverse flow to the container 62.

In each weighing apparatus 54, 56 the container 62 is mounted directly for movement with the scale 64. As the tank becomes filled it moves downwardly to actuate a switch 82 to a closed position to energize a relay closing a switch 84. The switch 84, a manually operated switch 86 and a drive motor 88 for driving the pump 66 are in series circuit with a power source (unidentified). The closing of the switch 84 presets the circuit for the operation of the pump which is energized upon the closing of the switch 86 effected by an operator after he has noted the reading on the scale 64. After the tank has been emptied its upward movement with the scale 64 will actuate the switch 82 to open position to deenergize and stop the operation of the pump 66.

Besides knowing the quantity and/or weight of the different fluids in the two containers, it is also necessary to know the time it took to fill the containers to such extent to determine the flow ratios thereof. To time the flow interval, the three way valves 50, 52 are each controlled by the control apparatus 70 which comprises air cylinders 90, 92 to actuate the valves 50, 52 respectively, solenoid operated valves 94, 96 to control the air cylinders 90, 92 respectively, a timer control 98 and an electrical circuit 100.

The timer control 98 comprises switches 104, 106 actuated by timing mechanism (not shown) to control the energization of the solenoid operated valves 94, 96.

Each of the solenoid operated valves 94, 96 are connected by conduits 110, 112 respectively to a suitable source of supply of compressed air, or the like. The valve 94 is connected by conduits 114, 116 to the air cylinder 90, and the valve 96 is connected by conduits 118, 120 to the air cylinder 92. Each of the air cylinders 90, 92 is provided with a movable piston that is connected by suitable linkage 122, 124 to the valves 50, 52 respectively.

The electrical circuit 100 comprises conductors 130, 132 leading from a suitable source of electrical power. The conductor 130 connects to one side of switches 104, 106. The opposite side of the switch 104 is connected by a conductor 134 to the solenoid operated valve 94. The opposite side of the switch 106 is connected by a conductor 136 to the solenoid operated valve 96. Each solenoid operated valve has its return side connected to the conductor 132.

The timer control 98 may be driven by an electric motor 140 which is directly connected to the electrical conductors 130, 132 through a manually operated switch 142.

In the operation of the dispensing machine, the two fluid pumps 36, 42 are connected into the circuit for continuous operation by closing switch 150. Other suitable means may be used if it is not desired to operate the pumps continuously but are not shown in this instance.

If no dispensing of the fluids is desired, the valves 30, 32 are set to close the flow of fluid to the mixing chamber 34 and to recirculate the fluids back into their respective storage tanks.

The actual controls for valves 30, 32 are not shown since they form no particular part of the present invention. However, it will be appreciated that they may be of any conventionally known manual or automatic type.

The details of the dispensing head 22 are also unimportant to the present invention and have been eliminated except to show that the valves 30, 32 either divert fluid flow from the head or admit it to the mixing chamber 34 from which it is subsequently directed elsewhere for use.

When the dispensing apparatus is initially started the operator may check the different fluid flow measuring systems by closing the switches 104 and 106 for whichever system is to be checked. This will activate the respective solenoid controls 94, 96 and their valves 90, 92 in turn to operate the valves 50, 52 and divert fluid flow into the respective fluid flow measuring systems.

The valves 50, 52 will cause fluid to be directed into flow lines 72, to the measuring tanks 62, and, after switches 86 are closed to operate pumps 66, to be returned through lines 74 to the storage tanks 24, 26 from which the fluid was initially drawn. In the course of this singular operation of each system separately, the scales 64 may be read and comparative information may be deduced therefrom. However, other means are more useful in this regard.

The timer control 98 operates both of the switches 104, 106, or either thereof, and for predetermined and prescribed intervals of time. It may be of any well known and conventional type which will perform such function and no details thereof are considered necessary.

By closing first one of the switches 104, 106, and after a prescribed time interval the other, and then opening them together, or closing them together and opening them at different time intervals, or any combination thereof, innumerable timed relations for the two fluids flowing into the weighing containers 62 is possible. Thus, the valve control means can be used in comparing fluid flow rates. For example, when one fluid normally flows twice as fast as the other a timed flow twice as long for the slower flowing fluid should cause the containers 62 to ultimately measure the same. If their readings do not compare then something is wrong.

Aside from the flow rate timing means of the timer control 98, it will be appreciated in passing that respectively different sized measuring containers 62, responsive weight sensitivity, length of flow lines, size, etc. can be used in a somewhat like manner. For example, collecting only half as much of the slower flowing fluid in the same time, with reference to the previous example.

In the disclosed system, the timer 98 is set to close and open the switches 104, 106 in accord with the relative known flow characteristics of the two fluid ingredients used. Accordingly, a time measured flow of fluid is diverted into each of the measuring tanks 62. When the tanks begin to fill the switches 82 are closed. After the flow of fluid to the tanks is stopped, and a comparative reading of the two scales 64 is made, the switches 86 are closed, carrying with them switches 84, and the pumps 66 are started and operated until the fluid containers 62 are emptied. This opens switches 82 and resets the return pump circuit.

If the two weight readings are the same, or whatever they are supposed to be, everything is alright. If one is over or under reading then some compensation must be made in the dispensing flow system and the test should be rerun to confirm that a proper correction has been made.

Changing the amount of fluid flowing into the mixing chamber 34 through one of the valves 30, 32 to regain correct proportions may be accomplished in any of a number of ways. For example, the output of the variable displacement pump 36 could be varied, or the valves 30, 32 might be regulated for different flows. It should also be apparent, even though not specifically shown, that the container readings on scales 64 could be electrically related to control means for automatically changing the flow rates to what they should be.

Although only a preferred form of the invention has been illustrated, and that form described in detail, it will be apparent to those skilled in the art that various modi-

I claim:
1. Fluid mixing and dispensing apparatus, comprising; separate fluid sources and a common mixing and dispensing head having respectively separate fluid supply and return lines provided therebetween, a by-pass line provided in each of said return lines, fluid collecting and weighing means provided in each of said by-pass lines, a control valve provided between said return and by-pass lines, and means operatively connected to each of said control valves for separate opening and closing actuation thereof in timed relation to each of said other control valves.

2. Means for measuring and comparing fluid flow rates in fluid mixing and dispensing apparatus, comprising; respectively separate fluid supply and return lines connected between separate fluid supply sources and a common mixing and dispensing head, variable displacement pumps provided in said supply lines, fluid flow by-passes provided in said return lines, fluid collecting and weighing means provided in said fluid flow by-passes, control valves provided between said return lines and said by-passes, timer means operatively connected to each of said control valves, and a timer motor operatively connected to said timer means for coordinated control thereof in accord with predetermined relative characteristics of the fluids being measured and compared.

References Cited by the Examiner
UNITED STATES PATENTS

| | | | |
|---|---|---|---|
| 2,392,951 | 1/1946 | Salisbury | 73—168 X |
| 2,523,179 | 9/1950 | Alvord | 73—1 |
| 2,876,639 | 3/1959 | Loizzo et al. | 73—223 |
| 3,216,622 | 11/1965 | Drostholm | 222—135 |
| 3,230,761 | 1/1966 | Sanders | 73—168 X |

OTHER REFERENCES

Addison: Hydraulic Measurements, 2nd ed., John Wiley & Sons, New York, 1949, pp. 72 to 76 relied upon.

LOUIS R. PRINCE, *Primary Examiner.*

S. C. SWISHER, *Assistant Examiner.*